(12) United States Patent
Boskamp

(10) Patent No.: US 6,318,734 B1
(45) Date of Patent: Nov. 20, 2001

(54) GASKET WITH INTEGRAL SUPPORT

(75) Inventor: Eddy B. Boskamp, Menomonee Falls, WI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/469,134

(22) Filed: Dec. 21, 1999

(51) Int. Cl.$^7$ ...................................................... F16J 15/06
(52) U.S. Cl. ........................ 277/598; 277/591; 277/609; 277/616
(58) Field of Search ..................................... 277/313, 314, 277/591, 598, 597, 609, 616, 620, 623, 627, 637; 285/379, 380

(56) References Cited

U.S. PATENT DOCUMENTS

| | | |
|---|---|---|
| 2,867,464 * 11/1959 | Crampton | ............................. 277/313 |
| 4,612,767 9/1986 | Engquist . | |
| 4,699,232 10/1987 | Nebu et al. . | |
| 5,233,832 8/1993 | Moore, III . | |
| 5,347,810 9/1994 | Moore, III . | |
| 5,529,313 * 6/1996 | Malks | ..................................... 277/314 |
| 6,161,875 * 12/2000 | Yamaji et al. | .......................... 285/24 |
| 6,231,050 * 5/2001 | Raden | ................................... 277/398 |

* cited by examiner

Primary Examiner—Anthony Knight
Assistant Examiner—Enoch E. Peavey
(74) Attorney, Agent, or Firm—Rader, Fishman & Grauer PLLC

(57) ABSTRACT

A gasket having an integral support is provided that is suitable for use in connection with a heat shield in a gasket-heat shield assembly. The integral support may include a receiving cavity designed to accurately position and retain a portion of the heat shield. The integral support and gasket may further incorporate additional integral features to improve the positioning and connection of the heat shield to the gasket. A method for assembling a gasket-heat shield assembly is also disclosed.

20 Claims, 3 Drawing Sheets

GASKET WITH INTEGRAL SUPPORT

FIELD OF THE INVENTION

The present invention generally relates to gaskets. More particularly, the resent invention relates to a gasket having an integral support that is suitable for use with a heat shield in a high-temperature environment.

BACKGROUND OF THE INVENTION

Gaskets are often used as a layer of material placed between contact surfaces or parts needing a sealed joint. Gaskets are commonly employed to prevent the escape of gas or leakage between two contact surfaces that are bolted together, a task that is difficult to accomplish in high-temperature, high-pressure environments, such as that of an internal combustion engine. A common application involves the placement of a metallic gasket between a cylinder head and an exhaust manifold. Another application involves gasket placement between the exhaust manifold and an exhaust pipe flange. Gaskets for either application are considered high temperature gaskets, and more particularly exhaust manifold gaskets, since the gaskets provide an exhaust seal that is intended to prevent the byproducts of combustion exiting the engine from escaping into the engine compartment of a vehicle.

Because exhaust from an engine is extremely hot, heat shields are commonly incorporated into the exhaust system to protect other underhood components from excessive temperature and to help protect people from burns and other injuries that could result from physical contact with the system. In general, such heat shields are formed from a corrosion-resistant metal, such as aluminized steel, which is die-formed to conform generally to the shape of a manifold while providing air space between the components. In some instances, a multi-layer heat shield may be used to further improve the heat resistance and to provide a sound damping effect.

Such manifold-type gaskets are typically installed by positioning the gasket between a first mating component, such as a cylinder head, and a second mating component, such as an exhaust manifold. Apertures formed in the gasket are then aligned with the corresponding apertures formed in the mating components. Commonly, a threaded fastener is then passed through the select apertures of the first mating component and gasket to engage a corresponding threaded aperture formed in the second mating component. A heat shield is then usually incorporated into the assembly and secured in a conventional manner.

In a number of known assemblies, a heat shield is attached to various components, such as engine components, using a plurality of separate fasteners, tabs and spacers. In other applications, the heat shield is attached to a component, such as a cylinder block, with a sealing material. However, both of those methods necessarily involve the use of additional fastening components and/or sealing materials that can often be lost or dislodged, causing misalignment and less secure assemblies. Furthermore, such conventional heat shield assembly methods often involve more complicated and time-consuming positioning and assembly procedures.

Based upon such limitations, there exists a need in the industry for an improved gasket that provides support for a heat shield assembly in an efficient, reliable and economic manner.

SUMMARY OF THE INVENTION

The present invention recognizes the limitations associated with currently available gaskets. Moreover, the invention is particularly useful in connection with gasket-heat shield assemblies for high-temperature environments, such as an internal combustion engine. A principal feature of the present invention is the inclusion of an integral support as a part of a gasket. The integral support is designed to retain a portion of a heat shield without requiring additional components or sealing materials. With such a design, the user can fasten the heat shield to a component without adding unnecessary or complicated fastening elements, thereby minimizing the number of elements to be included in the assembly. Thus, a significant advantage is provided over systems wherein additional components or assembly steps can lead to misalignment and more time-consuming and less effective retention. Further, because additional parts are not necessary to secure the support, a gasket constructed in accordance with the principles of the present invention can be installed in the gasket-heat shield assembly with accurate positioning and alignment in a timely, cost-effective and more efficient manner.

In accordance with an embodiment of the invention, a gasket having an integral support is provided that is suitable for use in connection with a gasket-heat shield assembly. In addition to a gasket, a typical gasket-heat shield assembly also includes a heat shield and first and second mating components. In practice, the first and second mating components will have at least one corresponding connection aperture and at least one fluid flow aperture, although a plurality of each type of aperture is possible, and generally preferred.

The gasket, which is typically formed from steel, stainless steel, copper, or a combination metal, is comprised of a lower portion and an upper portion. The lower portion is typically planar in nature and includes at least one connection aperture and at least one fluid flow aperture. The connection aperture and fluid flow aperture of the gasket will generally correspond to one or more respective apertures in the first and second mating components when the gasket is incorporated into a gasket-heat shield assembly. The upper portion of the gasket is located on top of the lower portion and includes an integral support having a receiving cavity. The receiving cavity is generally configured to receive and retain a portion of a heat shield.

In another embodiment of the present invention, a gasket such as the type previously described further includes integral formations, such as darts and/or buttons that extend into and/or from the surface of the receiving cavity. In a preferred embodiment, the integral formations on the surface of the integral support generally correspond to similar formations in the heat shield to further improve the horizontal positioning and retention of the heat shield within the receiving cavity.

In addition to the construction of an improved gasket, the present invention also discloses an improved method for installing a gasket and heat shield in a gasket-heat shield assembly. This method utilizes the advantages derived from such an improved gasket to provide an improved method for construction of a gasket-heat shield assembly.

BRIEF DESCRIPTIONS OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENT

Figure 1:
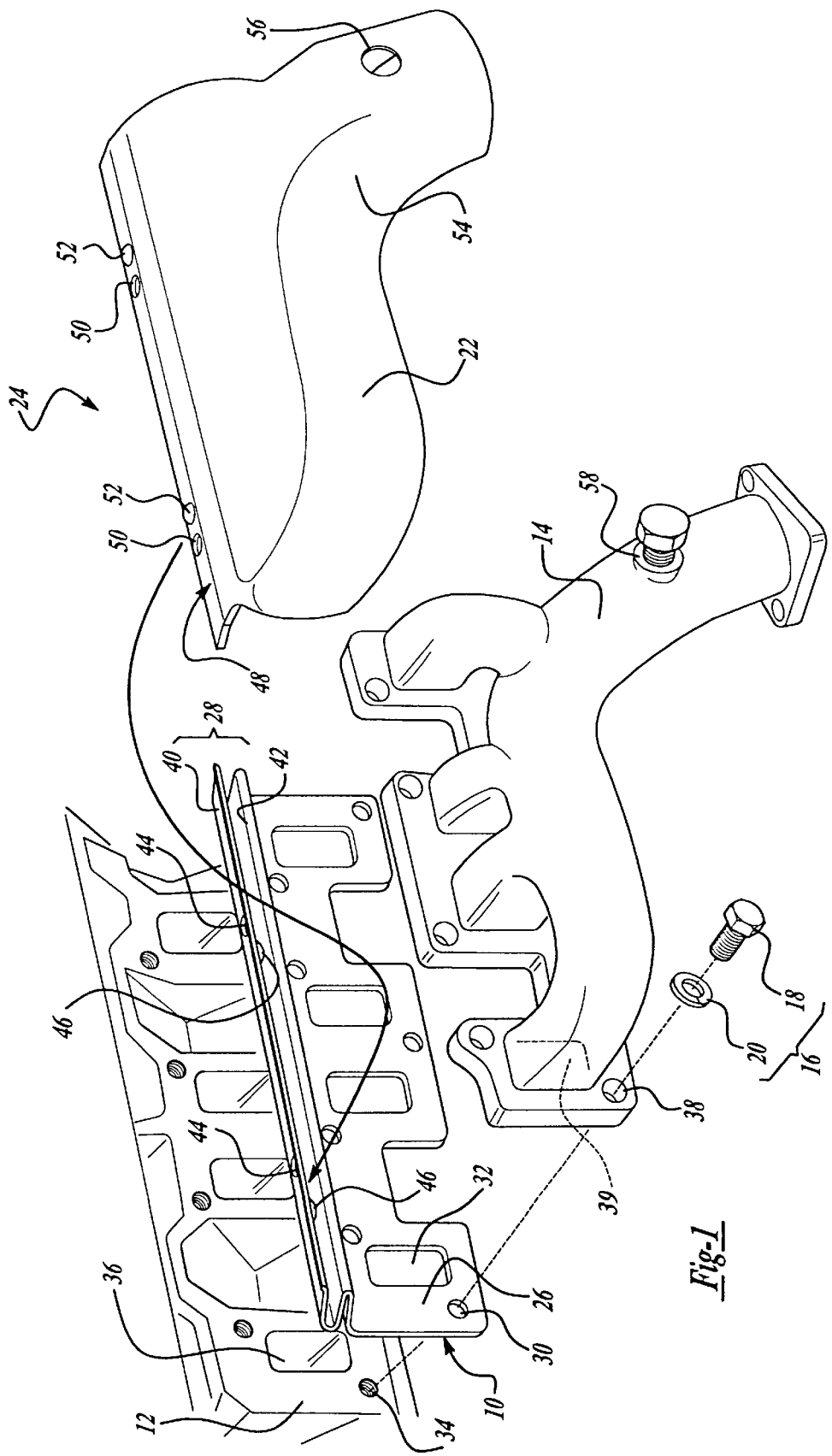
FIG. 1 is an exploded view of an embodiment of the present invention that illustrates the attachment of a heat shield to the upper portion of a gasket in a common gasket-heat shield assembly.

FIG. 1 shows an exploded view of one particular embodiment of the present invention. A gasket 10 constructed in accordance with the principles of the present invention is illustrated between first and second mating components 12 and 14, respectively. As represented in the depicted embodiment, the first mating component 12 may take the form of a cylinder head, while the second mating component 14 can correspondingly take the form of an exhaust manifold. During the assembly process, the gasket 10 is enclosed or "sandwiched" between the first mating component 12 and the second mating component 14, which are physically connected by a conventional connector 16, such as for example, the bolt 18 and spring washer 20 shown. A heat shield 22 covers a portion of one or both mating components 12,14 and engages the gasket 10 at the position generally indicated by the arrow. Taken in combination, parts 10, 12, 14, 16, and 22 are collectively referred to as a gasket-heat shield assembly 24.

In accordance with the principles of this invention, the gasket 10 includes a lower portion 26 and an upper portion 28. The lower portion 26 has an outer surface that is substantially planar and is preferably of a uniform thickness. The lower portion 26 of the gasket 10 further includes at least one connection aperture 30 and fluid flow aperture 32. The connection aperture 30 and fluid flow 32 will generally correspond to similarly sized apertures 34,36 of the first mating component 12 and a similarly sized aperture 38,39 of the second mating component 14 for purposes of constructing the assembly 24. As shown in the illustrated embodiment, the gasket 10 commonly includes a plurality of connection and fluid flow apertures designed to correspond to a plurality of mating apertures in both the first and second mating components. The primary function of the connection apertures, which are generally located towards the outer periphery of the gasket 10, is to connect the gasket 10 and the first and second mating components 12, 14. Correspondingly, the principal function of the corresponding and generally aligned apertures is to facilitate the transfer or flow of various gases and/or fluids flowing between the first and second mating components 12, 14.

The upper portion 28 of the gasket 10 includes an integral support 40 having a receiving cavity 42. The support 40 is preferably c-shaped or s-shaped when viewed in cross-section, but other constructions that provide a receiving cavity 42 with other geometric configurations are completely within the intended scope of the present invention. In a preferred embodiment, the cavity 42 is designed to receive and retain a portion of the heat shield 22. Further, the length of the integral support 40 taken along the plane of assembly will be approximately the length of the gasket 10 and the heat shield 22 to provide the preferred amount of heat shield coverage and structural support therefor. However, such congruity of components is not a requirement for the practice of the invention.

In accordance with another aspect of the present invention, the integral support 40 of the upper portion 28 of the gasket 10 may additionally include a support positioner, such as for instance, one or more protrusions, holes, and/or indentations. In FIG. 1, the support positioner includes a plurality of darts 44 and buttons 46.

Further, depending upon the application, the surface of the receiving cavity 42 may include various roughened portions, surface deformations and/or other protrusions. For example, a grated or roughened surface may be used to further improve the amount of contact friction that is afforded when a mating part, such as a heat shield, is frictionally retained therein.

The heat shield 22 includes a top edge or flange 48 that may additionally include a heat shield positioner, which generally corresponds to and compliments the support positioner of the integral support 40. The heat shield positioner of the flange 48 may include, for example, the darts 50 and buttons 52 illustrated.

Figure 2:
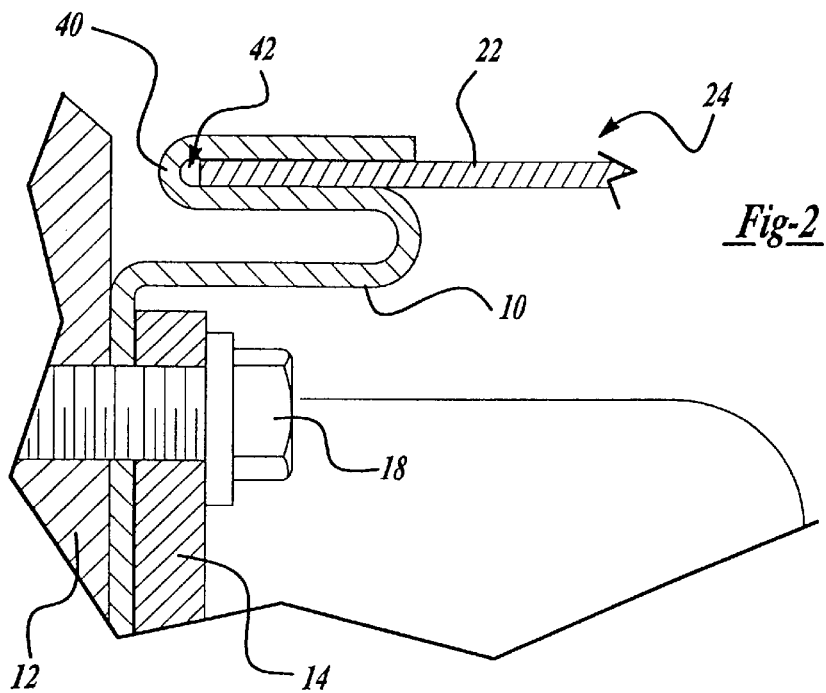
FIG. 2 is a side sectional view of an embodiment of the present invention that generally shows the attachment of a heat shield to the integral support of a gasket.

FIG. 2 depicts a side sectional view of an embodiment of a gasket-heat shield assembly 24, which further illustrates certain features of the present invention. In the illustrated embodiment, a gasket 10 is provided which has a generally s-shaped integral support 40. In accordance with the present invention, a heat shield 22 is shown retained within the receiving cavity 42 of the integral support 40.

Figure 3:
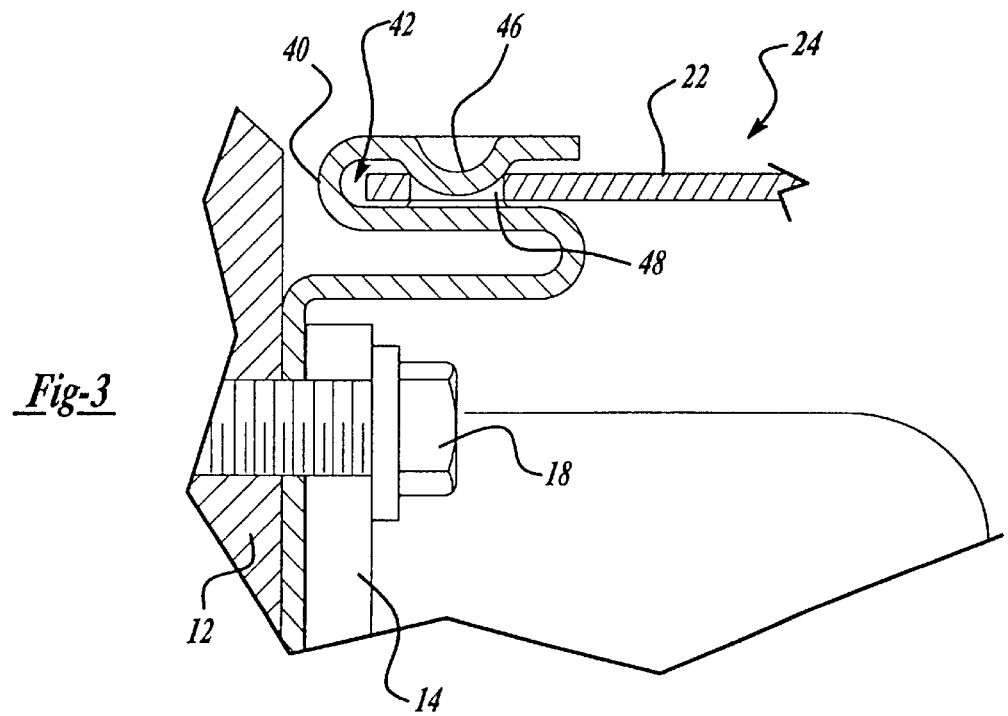
FIG. 3 is a side sectional view of another embodiment of the present invention, generally similar to the embodiment shown in FIG. 2, wherein the gasket and heat shield include additional features constructed in accordance with a further aspect of the present invention.

The side sectional view shown in FIG. 3 illustrates an embodiment a gasket-heat shield assembly 20 similar to that shown in FIG. 2 which further illustrates the interconnection of a support positioner of the gasket 10 with a heat shield positioner of the heat shield 22. The heat shield positioner, such as darts 44 and buttons 46, can be optionally added to the heat shield to more positively locate the heat shield, particularly in the lateral, or "slip," direction. As better viewed in the embodiment of FIG. 1, the darts 44 and buttons 46 of the gasket 10 correspond to the complimentary darts 50 and buttons 52 of the heat shield 22. Such formations serve to more accurately position the heat shield 22 and to improve the retention of the shield 22 within the receiving cavity 42 of the gasket 10.

For certain applications, it may be desirable to incorporate further means to more firmly secure the heat shield 22 to the gasket 10. In such cases, the upper portion 28 of the gasket 10, the heat shield 22, or an additional spacer layer (not shown) positioned between the first and second mating components 12, 14, can be formed to include a locking device (not shown) to more firmly secure, affix or fasten the heat shield 22 to the integral support 40. Most commonly, the locking device will be used to more firmly secure the heat shied 22 within the receiving cavity 42. For example, the gasket 10, the heat shield 22, or an additional spacer layer could include prefabricated tabs or clips designed to be firmly affixed or fastened to a formation on the gasket 10 or the heat shield 22, thereby "locking" or further securing the heat shield 22 into position.

Figure 4:
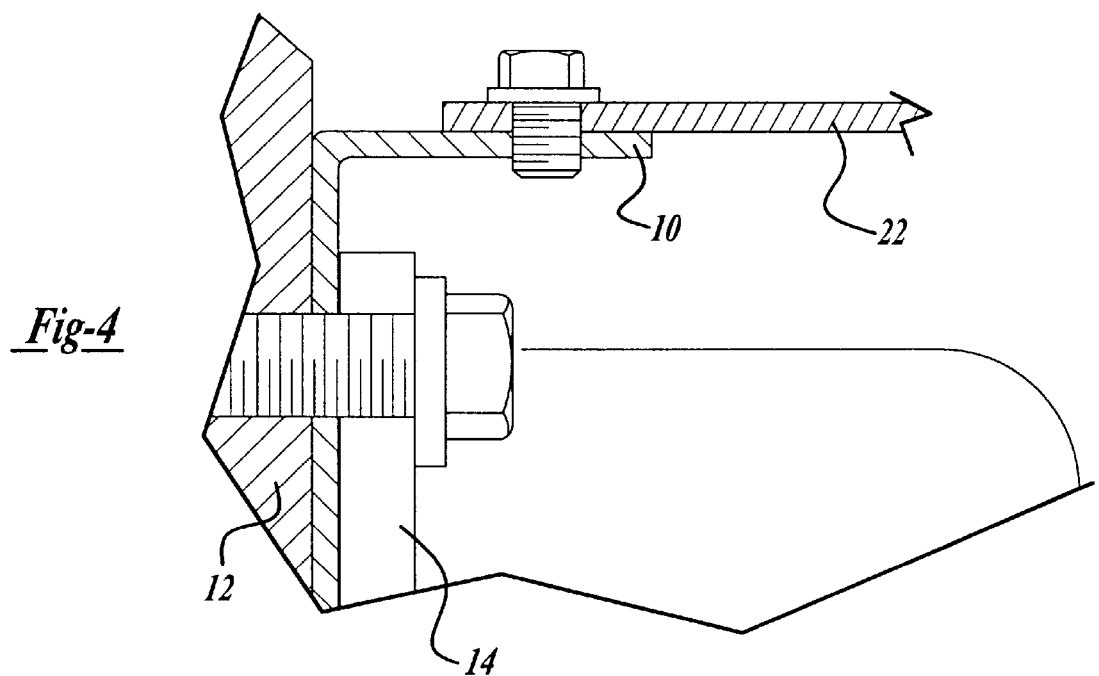
FIG. 4 is a side sectional view of yet another embodiment of the present invention.

FIG. 4 is a side sectional view of yet another embodiment of the present invention in which the upper portion 28 of the gasket 10 includes a generally flat lip or ledge. The lip or ledge or the upper portion 28 includes an integral positioner or support to properly align the gasket 10 and the shield 22. However, the positioner/support can also be used in connection with the securing of the heat shield 22 to the gasket 10. For instance, the upper portion 28 may include a formation, such as a hole with a ridge that mates with a corresponding structure in the shield 22. The heat shield 22 can be positioned above the gasket 10 (as shown) or, as may be desired for some applications, the heat shield 22 can be secured below the gasket 10. A crimped nut, a weld nut, a sheet metal screw, a welded stud, or a variety of similar conventional components can also be used to secure the components.

Another aspect of the present invention provides a method for constructing an improved gasket-heat shield assembly 24. The method includes the steps of: (i) positioning a gasket 10 including an integral support 28 between first and second mating components 12, 14; (ii) using a connector to connect the second mating component 14 to the first mating component 12 thereby securing the gasket 10 between the first and second mating components 12,14; and (iii) attaching a heat shield 22 to the integral support 28 of the gasket 10.

In a preferred method, the gasket 10 having an integral support 28 is positioned between the first mating component 12 and the second mating component 14. A connector 16, such as a bolt 18, is used to physically connect the second mating component 14 to the first mating component 12, thereby securing, or "sandwiching," the gasket 10 in-between. The connector 16 can include any conventional device, but is preferably a bolt 18 that meets the engineering requirements for the application. In the preferred method of assembly, a bolt 18 is first inserted through the connecting aperture 38 of the second mating component 14, then further inserted through the connecting aperture 30 of the gasket 10, and is inserted into the connecting aperture 34 of the first mating component 12. To facilitate the retention of the components, the connecting aperture 34 of the first mating component is generally threaded to receive and rigidly secure the bolt 18.

In a separate step, the lower portion 54 of the heat shield 22 is attached to the second mating component or a component in close proximity thereto. In the preferred method of constructing the gasket-heat shield assembly 24, the heat shield 22 and the second mating component 14 will both include at least one positioning device designed to engage one another. As shown in FIG. 1, the heat shield 22 includes a positioning hole 56 on the lower portion 54 which is sized to slip over and generally engage an integral locating feature 58 on the second mating component 14. In connection with another step of the assembly, the flange 48 of the heat shield 22 is received within the receiving cavity 42 of the gasket 10 and is physically retained therein.

Preferred embodiments of the present invention have been disclosed. A person of ordinary skill in the art would realize, however, that certain modifications would come within the teachings of this invention. Therefore, the following claims should be carefully studied to determine the true scope and content of the invention.

What is claimed is:

1. A gasket for use in retaining a heat shield in a gasket-heat shield assembly, the gasket-heat shield assembly including first and second mating components and a heat shield, said gasket comprising:

a lower portion; and an upper portion positioned above the lower portion, wherein the upper portion includes an integral support for retaining a portion of the heat shield.

2. A gasket as recited in claim 1, wherein the first and second mating components each include at least one connection aperture and at least one fluid flow aperture in respective alignment with one another.

3. A gasket as recited in claim 2, wherein the gasket includes at least one connection aperture corresponding to a connection aperture of the first and second mating components and at least one fluid flow aperture corresponding to a fluid flow aperture of the first and second mating components.

4. A gasket as recited in claim 1, wherein the integral support includes a receiving cavity to receive and retain the portion of the heat shield.

5. A gasket as recited in claim 4, wherein the receiving cavity is comprised of one or more integral folds.

6. A gasket as recited in claim 5, wherein the surface of the receiving cavity includes a surface deformation to facilitate frictional contact with a portion of the heat shield.

7. A gasket as recited in claim 4, wherein the receiving cavity has generally s-shaped configuration.

8. A gasket as recited in claim 4, wherein the receiving cavity has a generally c-shaped configuration.

9. A gasket as recited in claim 1, wherein the integral support includes a support positioner.

10. A gasket as recited in claim 9 wherein the support positioner includes at least one surface selected from the group consisting of protrusions, holes, and indentions.

11. A gasket as recited in claim 9 wherein the support positioner includes a dart and a button.

12. A gasket as recited in claim 1, wherein the upper portion of the gasket includes integral tabs to secure the heat shield once it is retained within the receiving cavity.

13. A method for assembling a gasket-heat shield assembly, wherein the assembly is comprised of a gasket, a heat shield, and first and second mating components, the method comprising the steps of:

providing a gasket having an integral support;

positioning the gasket between the first and second mating components;

securing the gasket between the first and second mating components; and attaching a heat shield to the integral support of the gasket.

14. A method according to claim 13, wherein the integral support of the gasket includes a support positioner and the heat shield includes a heat shield positioner.

15. A method according to claim 14, wherein the support positioner is in complimentary communication with the heat shield positioner.

16. A method according to claim 13, wherein the method includes the step of attaching the heat shied to the second mating component.

17. A gasket-heat shield assembly, including first and second mating components, said gasket-heat shield assembly comprising:

a heat shield; and a gasket having a lower portion and an upper portion positioned above the lower portion, wherein the upper portion includes an integral support and a receiving cavity for retaining a portion of the heat shield.

18. A gasket-heat shield assembly as recited in claim 17, wherein the heat shield includes a heat shield positioner.

19. A gasket-heat shield assembly as recited in claim 18, wherein the integral support includes a support positioner that compliments the heat shield positioner.

20. A gasket-heat shield assembly as recited in claim 17, wherein the assembly includes a locking device to secure the heat shield to the integral support of the gasket.

* * * * *

UNITED STATES PATENT AND TRADEMARK OFFICE
CERTIFICATE OF CORRECTION

PATENT NO.     : 6,318,734 B1
DATED          : November 20, 2001
INVENTOR(S)    : Ernert A. Oxenknecht It is certified that error appears in the above-identified patent and that said Letters Patent is hereby corrected as shown below:

<u>Title page,</u>
Item [75], Inventor, replace "Eddy B. Boskamp, Menomonee Falls, WI" with -- Ernest A. Oxenknecht, Grove, IL --.

Signed and Sealed this

Thirteenth Day of August, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.    : 6,318,734 B1
DATED         : November 20, 2001
INVENTOR(S)   : Ernest A. Oxenknecht It is certified that error appears in the above-identified patent and that said Letters Patent is hereby corrected as shown below:

<u>Title page,</u>
Item [75], Inventor, replace "Ernert A. Oxenknecht, Grove, IL" with -- Ernest A. Oxenknecht, Downers Grove, IL --.

Signed and Sealed this

Twelfth Day of November, 2002

*Attest:*

JAMES E. ROGAN
*Attesting Officer*    *Director of the United States Patent and Trademark Office*